United States Patent Office.

JAKOB SCHMID AND HERMANN REY, OF BASLE, SWITZERLAND, ASSIGNORS TO THE BADISCHE ANILIN AND SODA FABRIK, OF LUDWIGSHAFEN, GERMANY.

RED SULFO-ACID DYE.

SPECIFICATION forming part of Letters Patent No. 624,877, dated May 9, 1899.

Application filed December 28, 1897. Serial No. 663,899. (Specimens.)

*To all whom it may concern:*

Be it known that we, JAKOB SCHMID and HERMANN REY, chemists, citizens of the Swiss Republic, and residents of Basle, Switzerland, have invented certain new and useful Improvements in the Manufacture of Red Sulfo-Acid Dyes, of which the following is a specification.

We have found that the products of condensation of one molecule of an aldehyde compound of the aromatic series, as benzaldehyde and its products of substitution, and two molecules of a monobenzylated metaamidophenol for rhodamins, as benzylethylmetaamidophenol and benzylmethylmetaamidophenol, can be converted into valuable red sulfo-acid dyes by treating the said products of condensation successively or simultaneously with dehydrating, sulfonating, and oxidizing agents. The sulfo-acid dyes thus obtained dye wool and silk in red tints which resist the action of light, acids, and alkalies, and they also dye fiber very uniformly.

In practice it has been found that sulfuric acid is very suitable for use in the transformation of the above-specified products of condensation into red acid dyes. If the said products of condensation (which are usually precipitated entirely when the mass from the reaction is cooled) be recovered by recrystallization or by exhaustion with alcohol from benzylalkylamidophenol, which may still adhere thereto, and be afterward heated to 130° centigrade, with about three parts of concentrated sulfuric acid for about one and one-half hours, the pyrone nucleus will be formed through elimination of water, and simultaneously also sulfonation and partial oxidation will be effected. The pyrone leuco body thus formed does not, however, take up all the sulfo groups which it is capable of receiving. In some cases the coloring-matters obtained by further oxidation are not readily soluble, but readily-soluble products will be obtained if the pyrone body before oxidation or the dye therefrom be afterward further sulfonated by means of fuming sulfuric acid preferably at a low temperature. Any of the means of oxidation known to chemists and usually employed in such cases may be used. We find ferric chlorid to be a useful agent for the purpose.

Instead of employing the products of condensation of benzylated amidophenols with aldehydes we may make use of the products of condensation of the sulfobenzylated metaamidophenol, such as are obtained by sulfonating the benzylated metaamidophenols by means of fuming sulfuric acid, whereby sulfonated leuco bodies will be directly obtained.

The process may also be varied so far that products of condensation of monobenzylated metaamidophenols with aromatic aldehydes may be directly transformed into the new dyes by heating the said products of condensation for a longer time at a higher temperature (140° to 150°) with concentrated sulfuric acid, thus uniting in one operation all the three phases of reactions—that is to say, the separation of the water, the sulfonation, and the oxidation. The preparation of the new dyes, characterized as "sulfo benzyl-pyrone" dyes, will be readily understood by the following examples:

*Example I. Sulfo-acid dye derived from ethylbenzyl m-amidophenol and benzaldehyde.*—5.3 parts of benzaldehyde and twenty-three parts of ethylbenzylmetaamidophenol are dissolved in one hundred parts of alcohol and heated for twelve hours with one hundred parts of sulfuric acid of ten per cent. in a vessel having a cooler. After isolating the product of condensation is obtained in crystals, which are purified by recrystallization from alcohol. In order to transform the product of condensation into the sulfonated pyrone derivative, one part of the pure leuco body is heated to 130° centigrade for one and one-half hours with three parts of concentrated English sulfuric acid, and the molten mass obtained is poured on ice and filtered. The pressed precipitate is dissolved in forty parts of water with addition of the necessary quantity of soda, and the solution, already quite red in color, is further oxidized at the temperature of a water-bath with a solution of ferric chlorid of ten per cent., which contains one-half part of ferric chlorid and one part of hydrochloric acid. The sulfo-acid dye which separates out is dissolved in soda, and, after filtering, the coloring-matter is precipitated by means of common salt. The dry coloring-matter forms a brown-red brilliant powder which dissolves in water with a crimson-red coloration and a yellow fluorescence. Its solution in concentrated sulfuric acid is brown yellow and assumes, when diluted with water, with precipitation of dark-red flocks, the coloration of the aqueous solution. Wool and silk are dyed in an acid-bath of beautiful blue-red tints which are fast against acids and alkalies.

If in the described process the benzaldehyde be replaced by its products of substitution—such as chlorobenzaldehydes, sulfobenzaldehydes, amidobenzaldehydes, methylbenzaldehydes, oxybenzaldehydes, and alkyloxybenzaldehydes—without otherwise changing the process, there will be obtained coloring-matters of analogous properties, which dye from yellow red to bluish red.

*Example II. Sulfo-acid dye derived from sulfobenzaldehyde and ethylbenzyl-m-amidophenol.*—20.8 parts of sodium benzaldehyde-orthosulfonate or of sodium benzaldehyde-metasulfonate are dissolved in two hundred parts of sulfuric acid of ten per cent. and mixed with forty-six parts of ethylbenzyl-metaamidophenol dissolved in one hundred parts of alcohol. The mixture is heated during ten to twelve hours in the water-bath. The crystalline product of condensation separated, as above indicated, is transformed into the pyrone body by heating it to 130° centigrade with three parts of sulfuric acid. The original product of condensation, although containing already one sulfo group, is soluble with great difficulty in diluted alkalies; but when water has been separated it is very easily soluble. It will have been sulfonated at the same time. The process is completed exactly in the same manner as indicated in Example I. The coloring-matter obtained is a brown-red powder which is easily soluble in water. An amber-like yellow solution in concentrated sulfuric acid gives, when diluted with water, no precipitate.

Having thus described our invention, we claim—

1. The process for the manufacture of red sulfo-acid dyes, which consists in condensing one molecule of a benzaldehyde compound with two molecules of a monobenzylated met-amidophenol, then heating the product of condensation thus obtained with a reagent, whereby dehydration, sulfonation and partial oxidation are effected, and finally treating the resultant product with an oxidizing agent, substantially as set forth.

2. The process for the manufacture of red sulfo-acid dyes, which consists in condensing one molecule of a benzaldehyde compound with two molecules of a monobenzylated met-amidophenol, then heating the product of condensation up to 130° centigrade with concentrated sulfuric acid, then dissolving the precipitate in alkaline water, and finally completing the oxidation of the product with ferric chlorid at a moderate heat, substantially as set forth.

3. As a new article of manufacture, the herein-described red sulfo-acid dye, which is a brown-red powder, readily soluble in water with crimson-red coloration and yellow fluorescence, soluble in concentrated sulfuric acid with brown-yellow coloration, hardly soluble in alcohol, insoluble in ether and benzene, and dyes wool and silk in red tints fast to light, acids and alkalies.

In witness whereof we have hereunto signed our names in the presence of two subscribing witnesses.

JAKOB SCHMID.
HERMANN REY.

Witnesses:
GEORGE GIFFORD,
AMAND RITTER.